(12) United States Patent
Maiorana

(10) Patent No.: US 10,814,766 B2
(45) Date of Patent: Oct. 27, 2020

(54) FRAMELESS HALF-ROUND TRAILER WITH BUTT JOINTS

(71) Applicant: MAC TRAILER MANUFACTURING, INC., Alliance, OH (US)

(72) Inventor: James A. Maiorana, Hartville, OH (US)

(73) Assignee: Mac Trailer Manufacturing, Inc., Alliance, OH (US)

( * ) Notice: Subject to any disclaimer, the term of this patent is extended or adjusted under 35 U.S.C. 154(b) by 0 days.

(21) Appl. No.: 16/451,896

(22) Filed: Jun. 25, 2019

(65) Prior Publication Data

US 2019/0315261 A1 Oct. 17, 2019

Related U.S. Application Data

(62) Division of application No. 15/481,655, filed on Apr. 7, 2017, now Pat. No. 10,457,185.

(51) Int. Cl.
*B60P 1/28* (2006.01)
*B62D 53/06* (2006.01)
*B62D 33/023* (2006.01)
*B62D 35/00* (2006.01)

(52) U.S. Cl.
CPC ........... *B60P 1/286* (2013.01); *B62D 33/023* (2013.01); *B62D 35/001* (2013.01); *B62D 53/06* (2013.01)

(58) Field of Classification Search
CPC ............. B60P 1/28; B60P 1/286; B62D 65/04
See application file for complete search history.

(56) References Cited

U.S. PATENT DOCUMENTS

| 1,469,320 | A | 10/1923 | Kramer |
| 2,679,278 | A | 5/1954 | Clark |
| 3,187,425 | A | 6/1965 | Black et al. |
| 5,454,620 | A | 10/1995 | Hill et al. |
| 5,482,356 | A | 1/1996 | Goodson, Jr. |
| 6,637,808 | B1 | 10/2003 | Ling et al. |
| 8,398,151 | B2 | 3/2013 | Lindstrom |
| 8,550,542 | B1 | 10/2013 | Booher et al. |
| 9,085,331 | B1 | 7/2015 | McWilliams |
| 9,315,136 | B2 | 4/2016 | Kibler |
| 2002/0124370 | A1 | 9/2002 | Deckert et al. |
| 2002/0149254 | A1 | 10/2002 | Jensen |

(Continued)

FOREIGN PATENT DOCUMENTS

| CA | 2856260 | 7/2013 | |
| DE | 1281866 B | * 10/1968 | .............. B60P 1/286 |

(Continued)

*Primary Examiner* — Hilary L Gutman
(74) *Attorney, Agent, or Firm* — Sand, Sebolt & Wernow Co., LPA

(57) ABSTRACT

A frameless dump trailer is provided. The frameless dump trailer includes a forward body portion and a rear body portion. Each body portion is formed from two or more panels joined together with butt-joint welds. The forward portion is first formed by welding planar sections together. After the body portion is formed from the plurality of planar panels, the larger planar portion is rolled in a rolling system to define the arcuate shape of trailer body. Then, the forward and rear body portions are welding together with a transversely extending butt-weld.

19 Claims, 19 Drawing Sheets

(56) References Cited

U.S. PATENT DOCUMENTS

| | | | |
|---|---|---|---|
| 2002/0163224 A1* | 11/2002 | Kloepfer | B62D 33/046 |
| | | | 296/186.1 |
| 2004/0183334 A1 | 9/2004 | Bibeau | |
| 2010/0218700 A1 | 9/2010 | Aaron et al. | |
| 2012/0086185 A1 | 4/2012 | Kerr et al. | |
| 2016/0355117 A1 | 12/2016 | Wang et al. | |
| 2018/0015863 A1 | 1/2018 | Kibler | |
| 2018/0022259 A1* | 1/2018 | Zamorano | B62D 65/02 |
| | | | 296/183.2 |
| 2019/0263311 A1* | 8/2019 | Robbs | B23K 31/02 |

FOREIGN PATENT DOCUMENTS

| | | | |
|---|---|---|---|
| EP | 1319584 | 6/2003 | |
| FR | 2732052 A1 * | 9/1996 | B60P 1/28 |
| FR | 2928633 A1 * | 9/2009 | B60P 1/286 |
| WO | 2018130967 | 7/2018 | |

\* cited by examiner

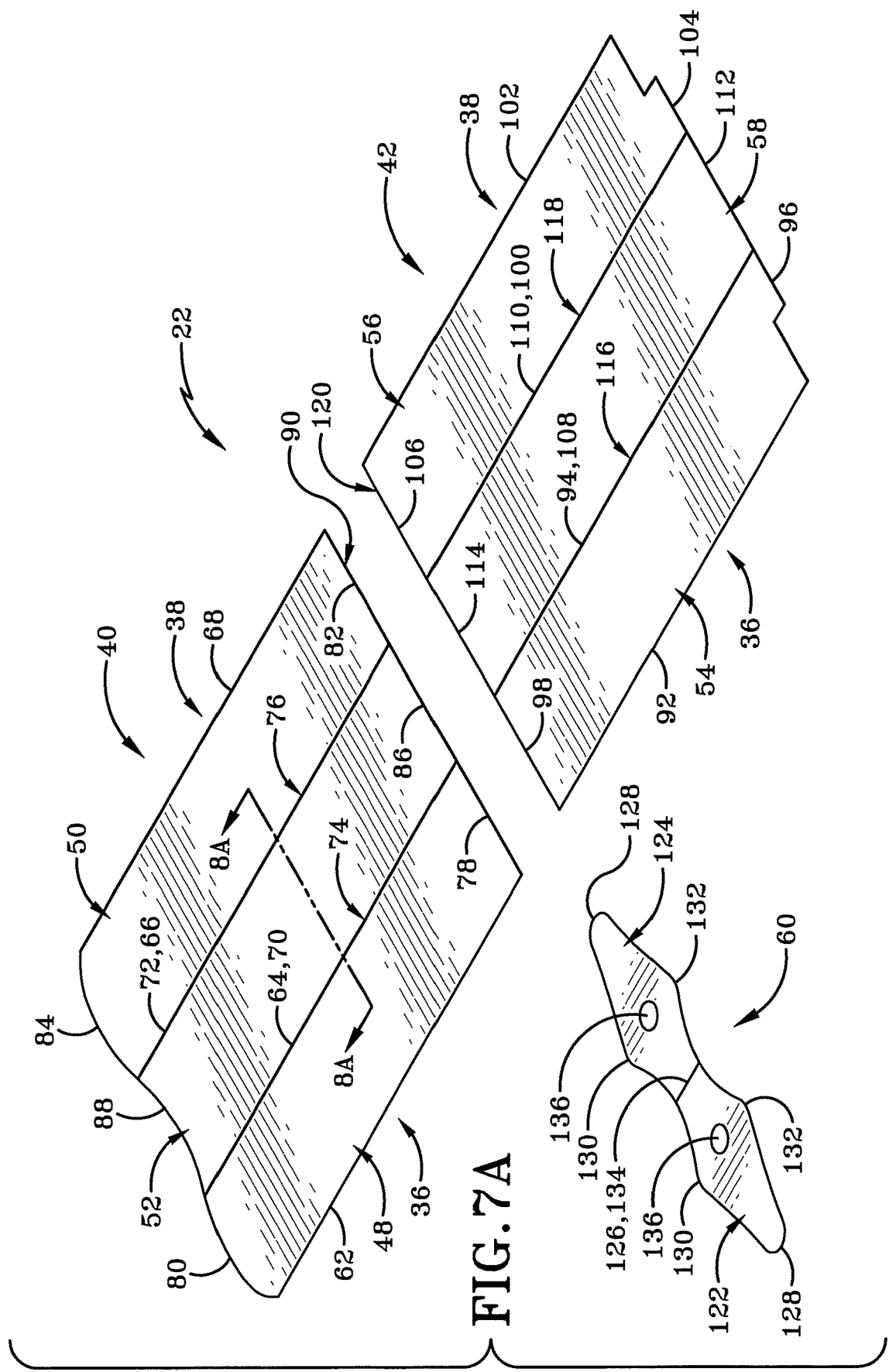

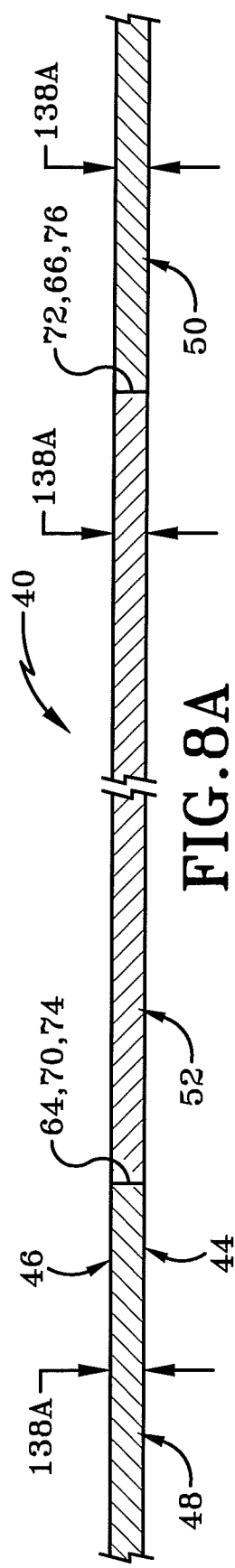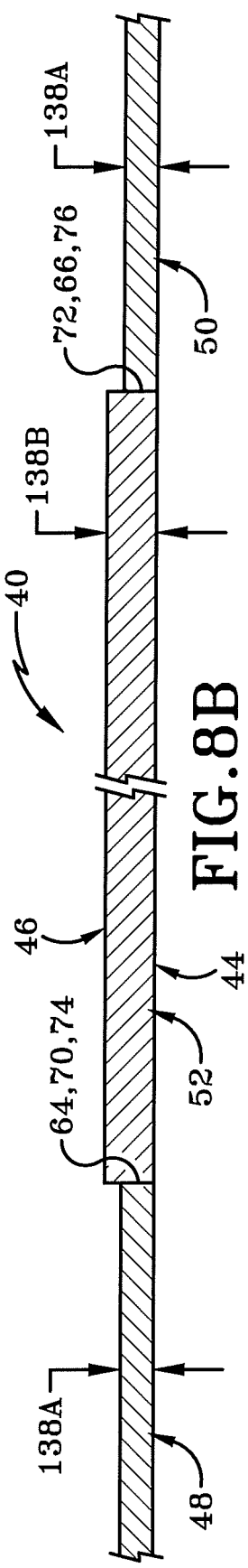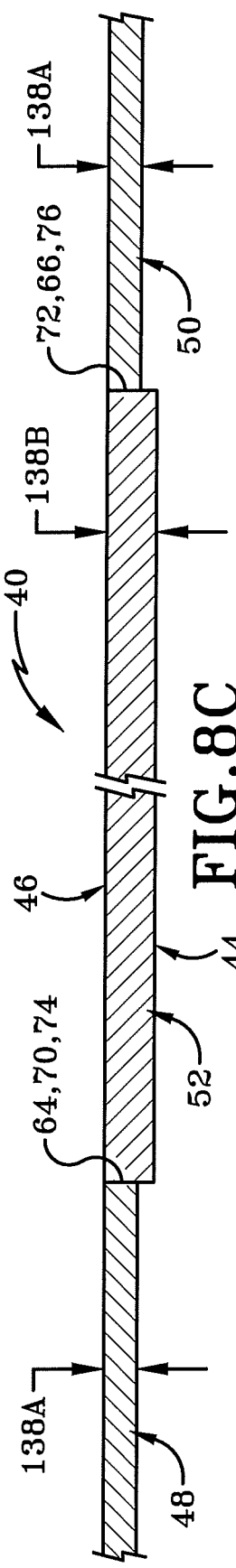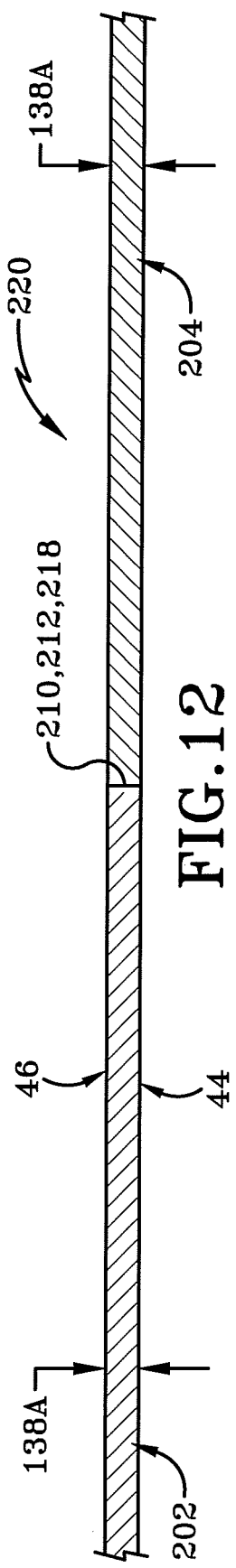

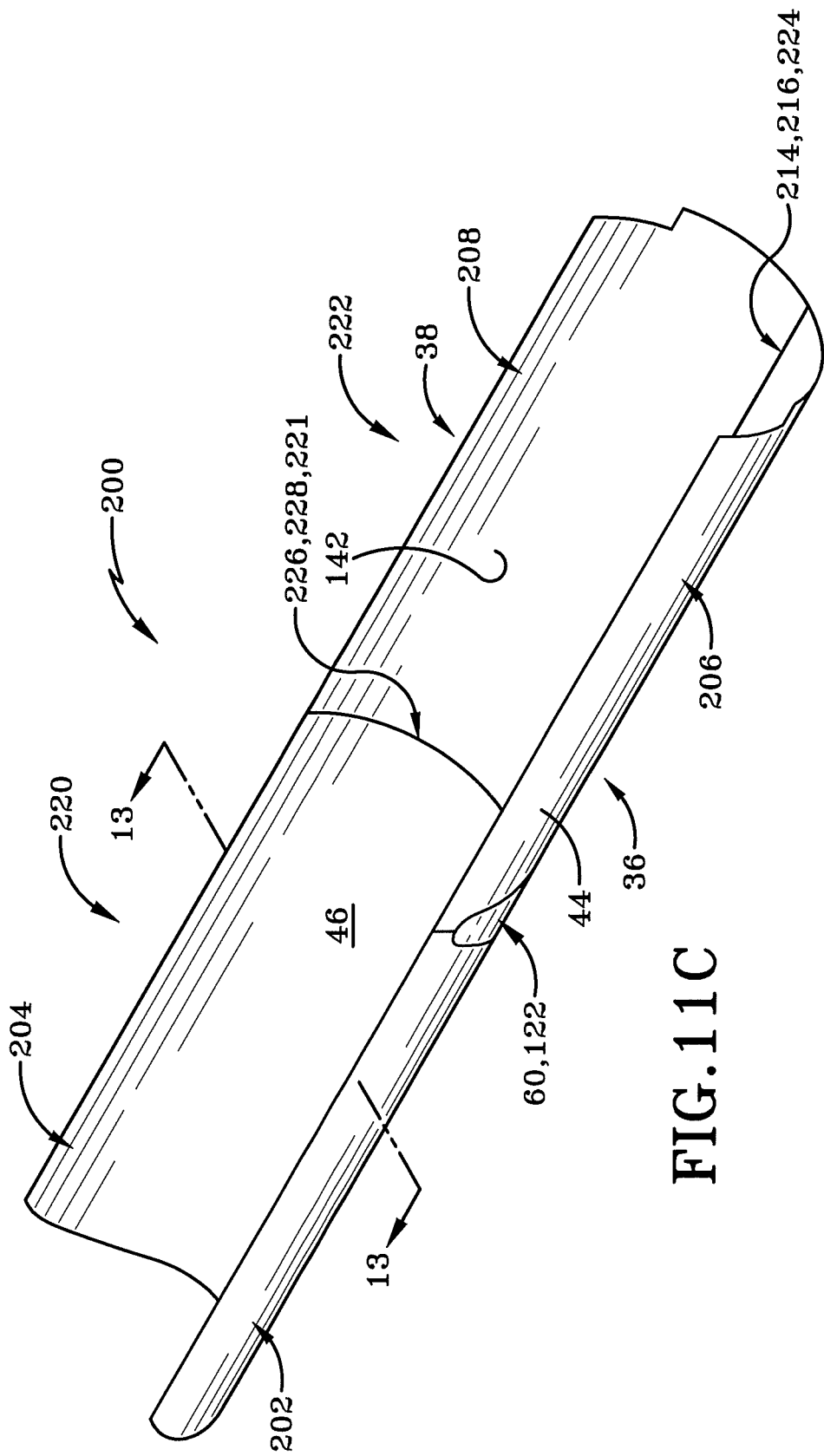

FRAMELESS HALF-ROUND TRAILER WITH BUTT JOINTS

CROSS REFERENCE TO RELATED APPLICATIONS

This is a Divisional application of U.S. patent application Ser. No. 15/481,655, filed on Apr. 7, 2017; the disclosure of which is incorporated herein by reference.

TECHNICAL FIELD

The present disclosure relates generally to frameless dump trailers. More particularly, the present disclosure relates to a frameless dump trailer formed from planar sections butt welded together.

BACKGROUND

Background Information

Frameless dump trailers are known to carry bulk materials when towed by a towing vehicle. Typically, the frameless dump trailers include a lifting system (often hydraulically operated) to tilt/raise the trailer in order the dump the bulk materials carried thereby.

A trailer body on the conventional frameless dump trailer is fabricated from metallic sections of arcuate panels welded together at overlapping lap joints. Lap joints are utilized because the panel sections are rolled prior to connecting them together. When the arcuate panels are joined together, the inner surface and the outer surface of the trailer body is not flush across the lap joint union. Rather, a step-wise relationship is formed in both the outer surface and the inner surface.

SUMMARY

Issues continue to exist with current frameless trailers and their method of assembly. Namely, it is desirable to provide a flush alignment of surfaces across joined panels that collectively form the trailer body. The present disclosure addresses these and other issues.

In one aspect, an embodiment of the present disclosure may provide a frameless dump trailer comprising: a forward end spaced from a rear end defining a longitudinal direction there between, and a first side opposite a second side defining a transverse direction there between; a forward trailer body portion defining the forward end and a rear trailer body portion defining the rear end; and wherein the forward trailer body portion is formed from a plurality of forward planar panels butt welded together side-by-side at forward longitudinal unions and then rolled into an arcuate configuration.

In another aspect, an embodiment of the present disclosure may provide a half-round dump trailer comprising: a forward end spaced apart from a rear end defining a longitudinal direction therebetween, a first side opposite a second side defining a transverse direction therebetween; a trailer body formed from a plurality of arcuate plates welded together at butt seams collectively defining an outwardly and downwardly facing convex outer surface on the trailer body and defining an inwardly and upwardly facing concave inner surface on the trailer body adapted to retain bulk materials; a longitudinally extending bottom butt welded seam between transversely adjoining arcuate plates, wherein the bottom butt welded seam extends from the forward end to the rear end and defines the lowermost portion of the concave inner surface on the trailer body; and a trolley supporting the trailer body from below adjacent the rear end.

In another aspect, an embodiment of the present disclosure may provide a method of forming a frameless dump trailer comprising the steps of: providing a first planar plate and a second planar plate; abutting the first and second planar plates and aligning flushly at least one surface surfaces on the first and second planar plates; welding the first and second planar plates at a first butt weld to establish a larger planar trailer body portion; and after welding the first and second planar plates together with the first butt weld, then rolling the larger planar first trailer body portion to establish an arcuate body portion.

In another aspect, an embodiment of the present disclosure may provide a frameless dump trailer. The frameless dump trailer includes a forward body portion and a rear body portion. Each body portion is formed from two or more panels joined together with butt joint welds. The forward portion is first formed by welding planar sections together. After the body portion is formed from the plurality of planar panels, the larger planar portion is rolled in a rolling system to define the arcuate shape of trailer body. Then, the forward and rear body portions are welded together with a transversely extending butt weld.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 7A is a perspective view of the trailer body of the first embodiment detailing a partially formed trailer body wherein the planar panels are joined together prior to being rolled into an arcuate profile;

FIG. 8A is a cross section view taken along line 8A-8A in FIG. 7A depicted a uniform thickness across the panels such that the inner and outer surfaces of the trailer body are flush;

FIG. 8B is a cross section view similar to FIG. 8A but depicting a thicker intermediate panel to define a step-wise profile of the inner surface and a flush outer surface;

FIG. 8C is a cross section view similar to FIG. 8A but depicting a thicker intermediate panel to define a step-wise profile of the outer surface and flush inner surface;

FIG. 11C is a perspective view of the trailer body of the second embodiment detailing the formed trailer body where a forward body portion is joined with a rear body portion;

FIG. 12 is a cross section view of the second embodiment taken along line 12-12 in FIG. 11B;

Similar numbers refer to similar parts throughout the drawings.

DETAILED DESCRIPTION

Figure 1:
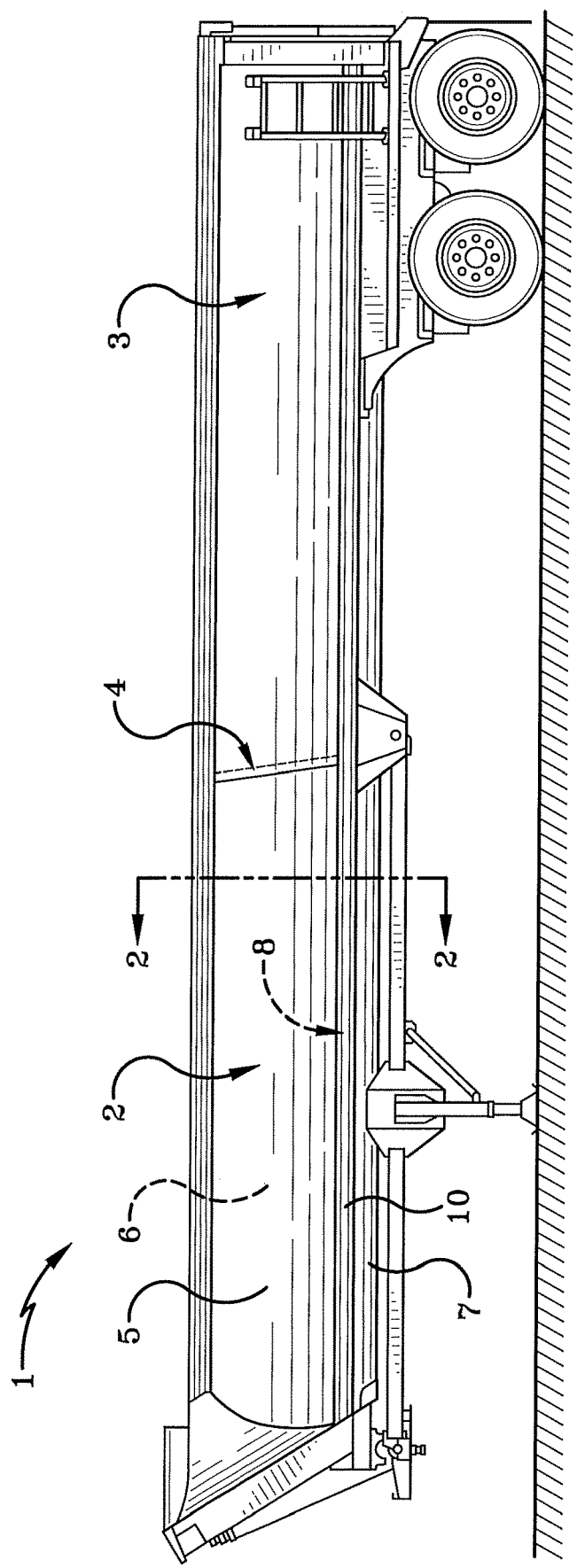
FIG. 1 is a side elevation view of a PRIOR ART frameless dump trailer.
Figure 2:
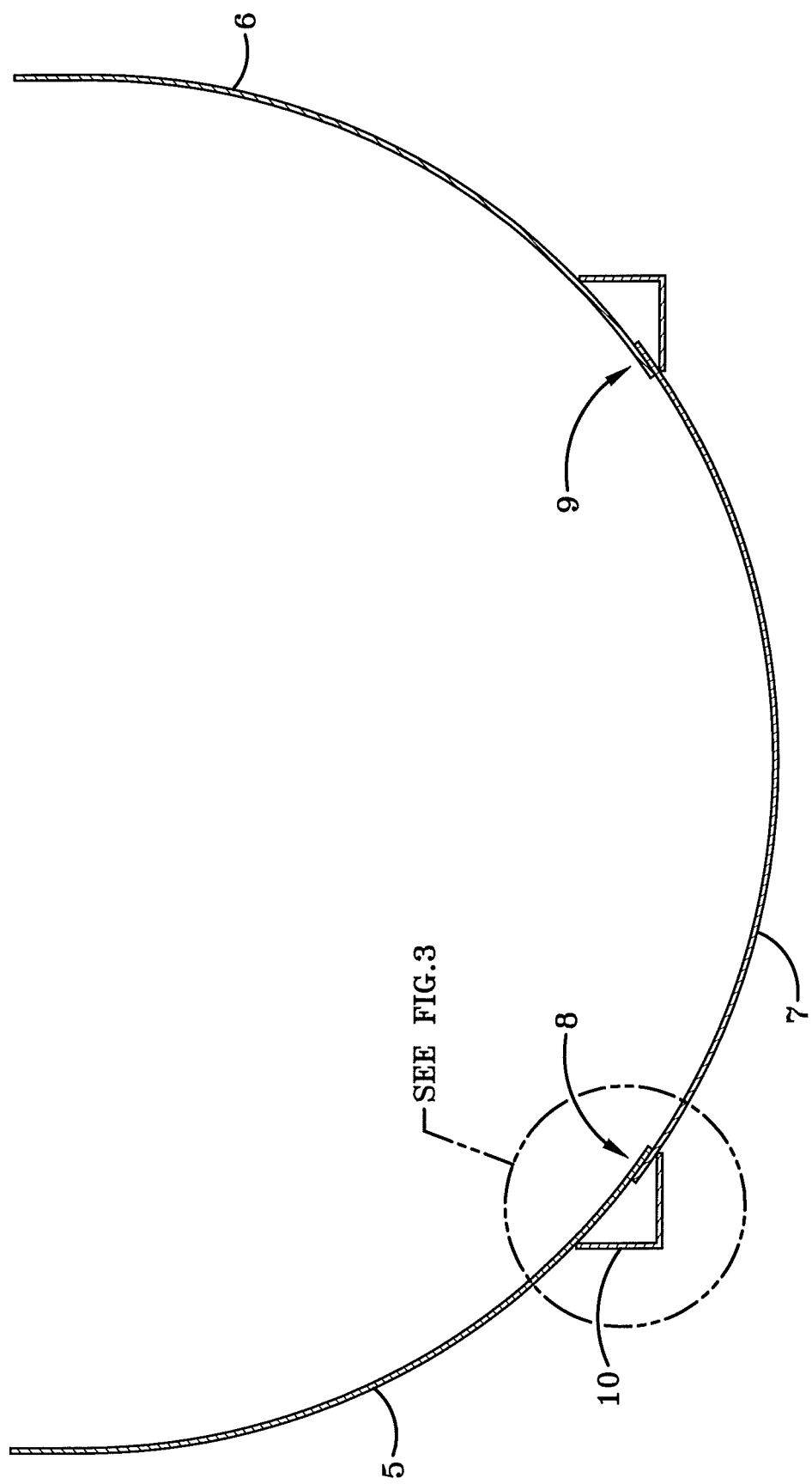
FIG. 2 is a cross section view of the PRIOR ART frameless dump trailer taken along line 2-2 in FIG. 1.
Figure 3:
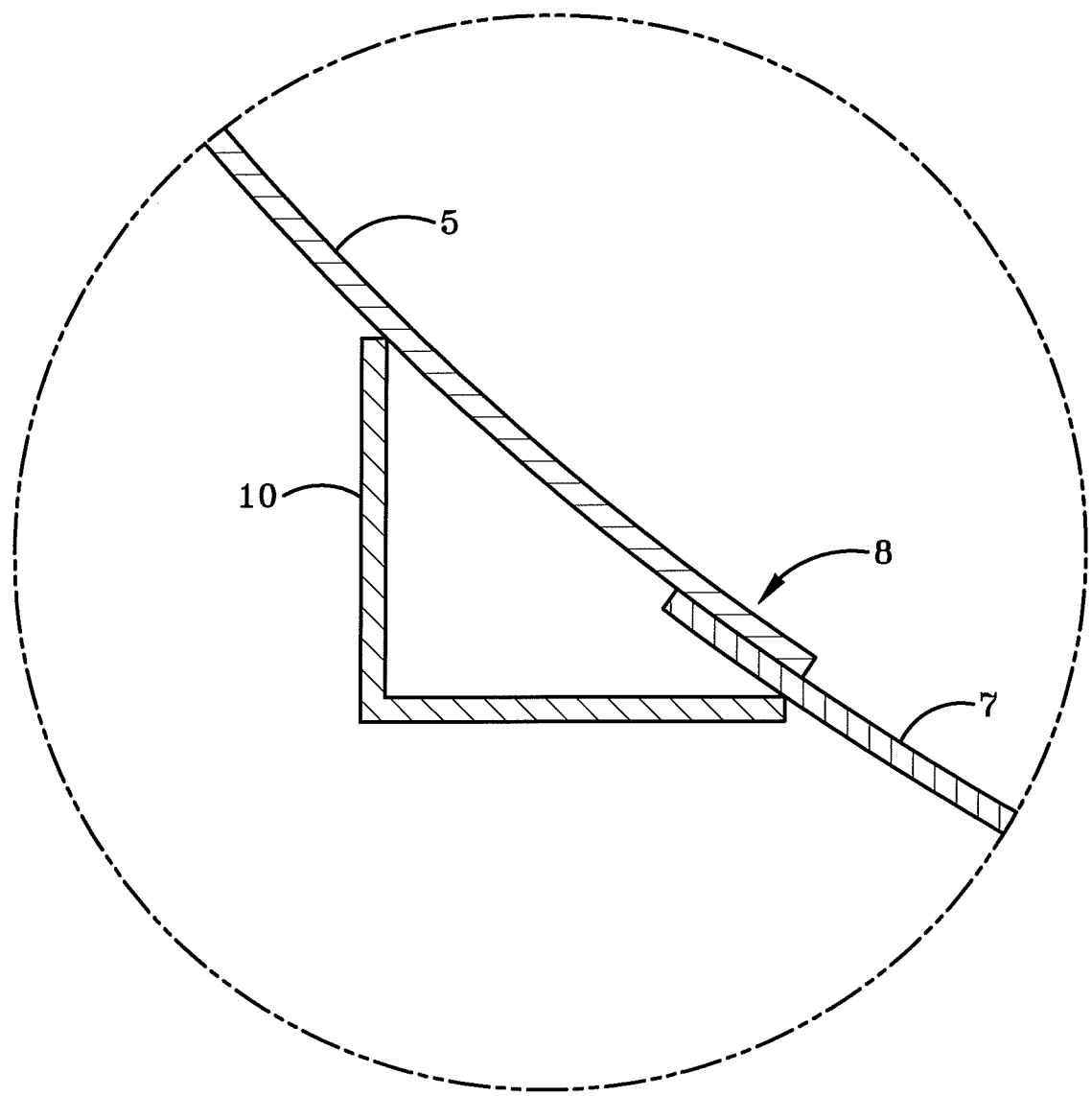
FIG. 3 is an enlarged cross section view of the PRIOR ART frameless dump trailer detailing the region labeled "SEE FIG. 3" in FIG. 2.

As depicted in FIG. 1 through FIG. 3, a prior art conventional half-round frameless dump trailer is generally indicated at 1. The conventional frameless dump trailer 1 includes a forward portion 2 and a rear portion 3. The forward portion 2 is welded to the rear portion 3 at an overlapping lap joint 4 located approximately near the longitudinal middle of trailer 1.

As depicted in FIG. 2, the conventional half-round frameless trailer forward portion 2 includes a plurality of arcuate panel segments welded together at overlapping lap joints. Particularly, a first arcuate panel 5 is associated with the left side of the conventional trailer 1, a second arcuate panel 6 is associated with the right side of the conventional trailer 1, and an intermediate third arcuate panel 7 is intermediate the first panel 5 and the second panel 6. The first panel 5 is connected to the third panel 7 at a first overlapping lap joint 8 and the second arcuate panel 6 is connected the intermediate third panel 7 at a second overlapping lap joint 9.

As depicted in FIG. 2 and FIG. 3, an angle iron support member 10 may extend longitudinally along the outside of the trailer 1 and may be welded to the outer surface of the respective first and third panels 5 and 7. A similar angle iron support member 10 may be positioned on the exterior surfaces of trailer 1 exterior to second lap joint 9.

With continued reference to FIG. 3, the assembled conventional trailer 1 includes a slight step down formed by the overlapping arcuate panels at lap joint 8, such that the inner surfaces of the convexly arcuate inner surfaces of adjoined panels 5, 7 are not flush once fully assembled. This is formed when the panels are rolled to give their arcuate shape. Namely, each individual panel, such as first panel 5, is first rolled in a rolling apparatus as one having ordinary skill in the art would understand. Then, another panel, such as third panel 7, is rolled in a rolling apparatus. Then, the arcuately formed panels are welded together. Because the curved panels are already arcuate, the lap joint 8 is formed by overlapping the first and third panels relative to each other. The lap joint is easy to align and can be easily welded with the segments already in the bent positon. After welding the lap joint 8, the exterior supportive member 10 may be welded to the outside to thereby attach its angle iron, or L-shaped cross section, to both the third panel 7 and the first panel 5.

Figure 4:
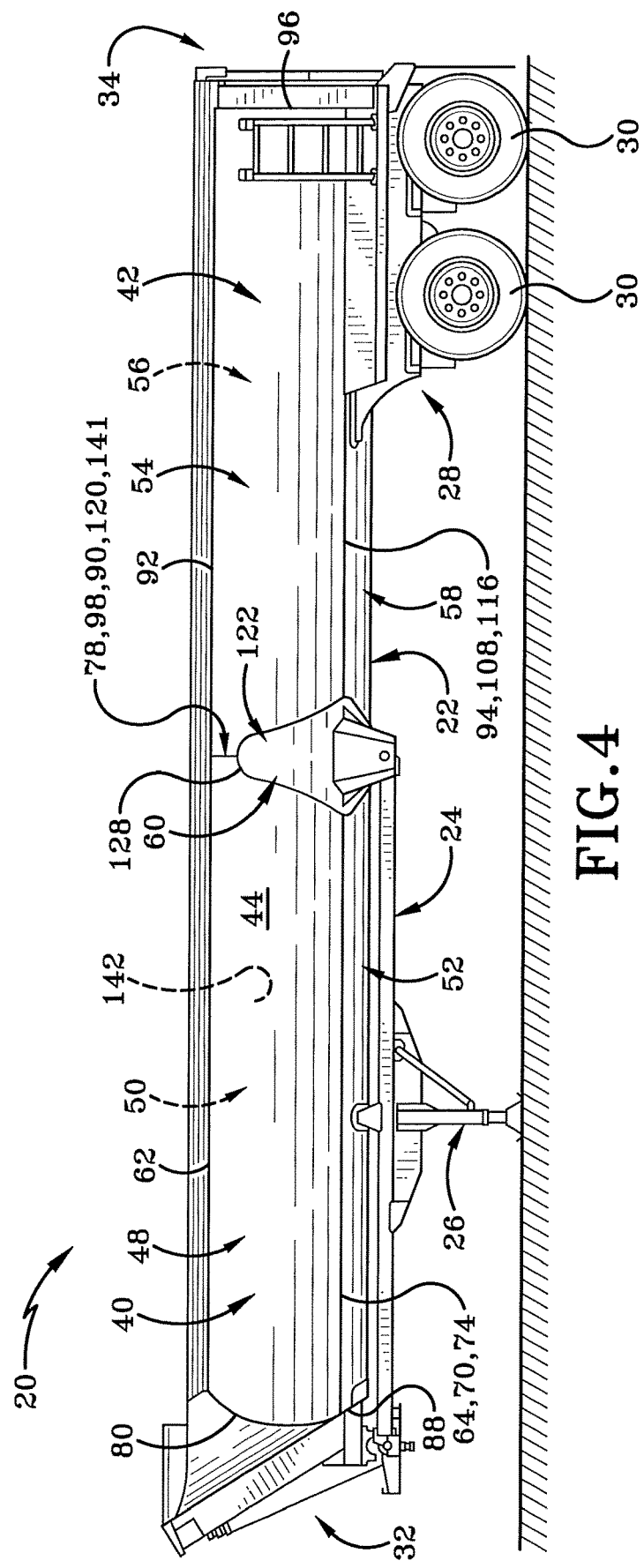
FIG. 4 is a side elevation view of a frameless dump trailer in accordance with a first embodiment of the present disclosure.

As depicted in FIG. 4, a half-round frameless dump trailer in accordance with the present disclosure is depicted generally at 20. The half-round frameless dump trailer 20 includes a trailer body 22, a lift arm 24 including landing gear 26, and a trolley assembly 28 including ground engaging wheels 30.

Trailer 20 further includes a forward end 32 and opposite a rear end 34 defining a longitudinal direction therebetween. Further, a first side 36 (FIG. 7C) is opposite a second side 38 (FIG. 7C) defining a transverse direction therebetween. The transverse direction is generally orthogonal to the longitudinal direction.

The trailer body 22 includes a forward portion 40 and a rear portion 42. Forward portion 40 is associated with the forward end 32 of the trailer and the rear portion 42 is associated with the rear end 34 of the trailer 20. The trailer body 22 includes a convex outer surface 44 spaced opposite a concave inner surface 46 (FIG. 7C) defining a containing volume therein. The containing volume stores bulk materials or other items hauled by trailer 20.

Figure 5:
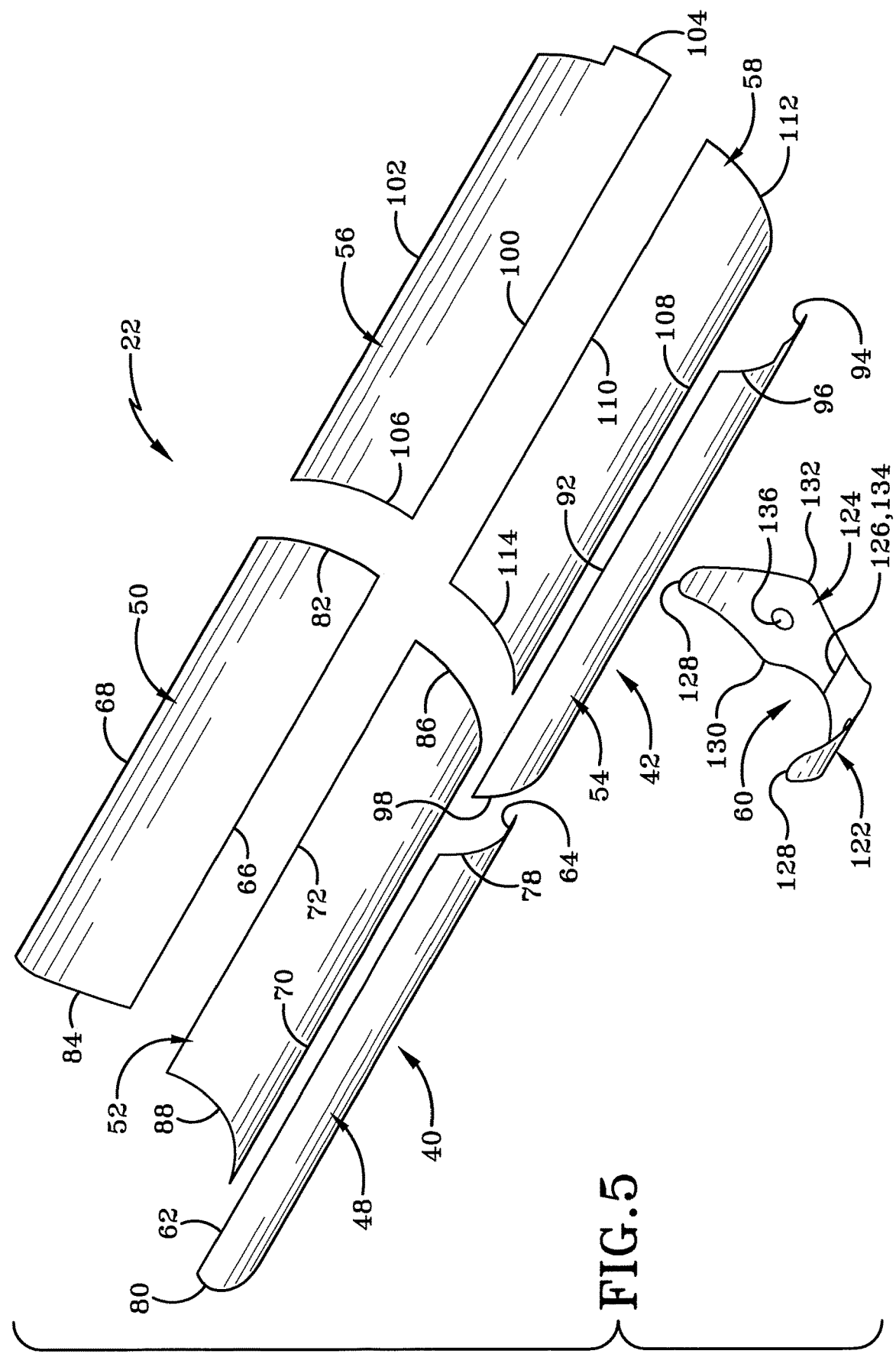
FIG. 5 is an exploded perspective view of a trailer body of the first embodiment detailing curved panels.

FIG. 5 depicts an exploded perspective view of the trailer body 22. The trailer body 22 includes a forward first panel section 48, a forward second panel section 50, a forward third panel section 52, a rear fourth panel section 54, a rear fifth panel section 56, and a rear sixth panel section 58. Additionally, the trailer body 22 may include a supportive bracing member 60.

Figure 6:
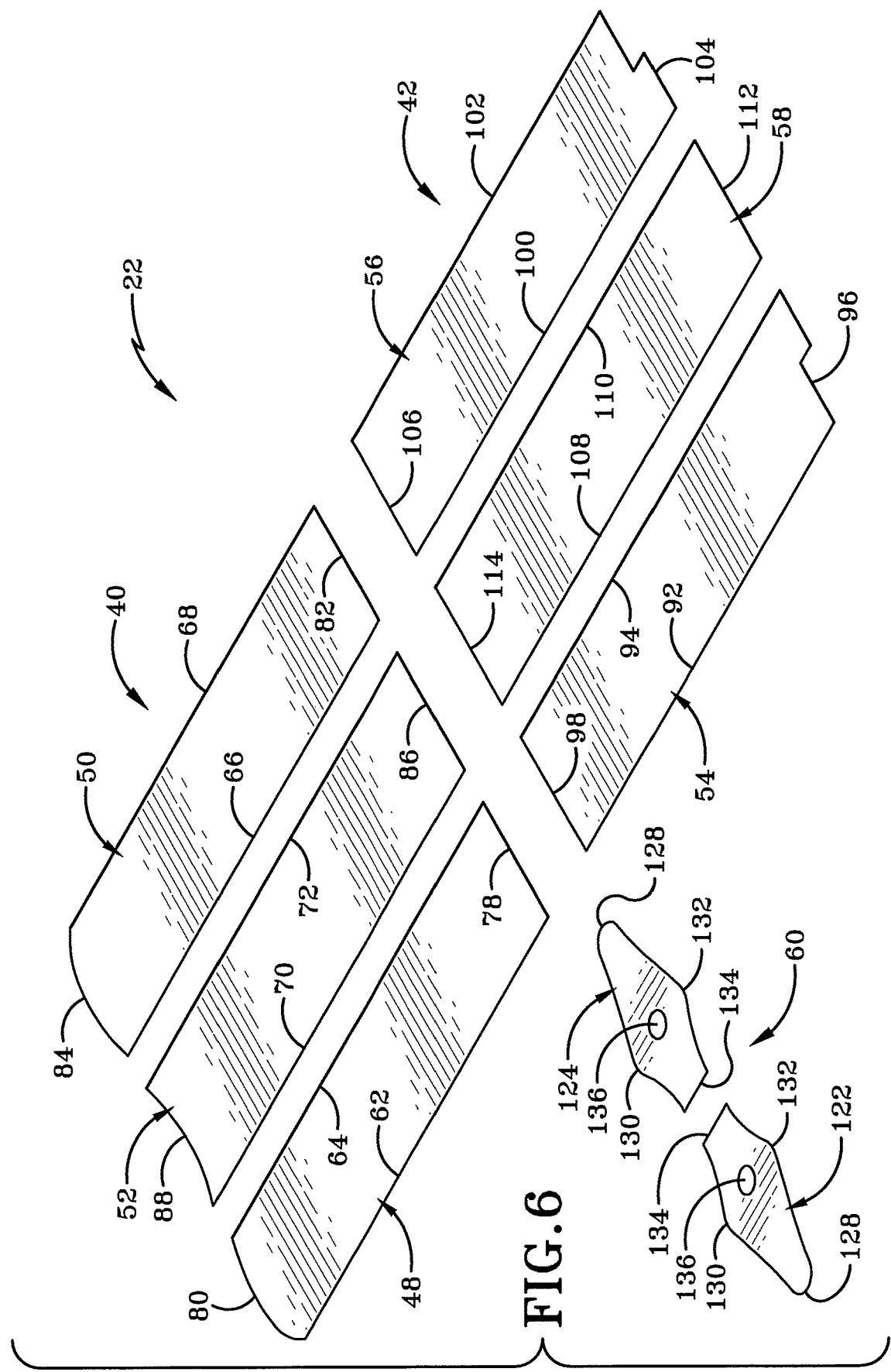
FIG. 6 is an exploded perspective view of the trailer body of the first embodiment detailing planar panels.

As depicted in FIG. 6 and FIG. 7A, the panel sections are planar flat members formed from metal sheets prior to being rolled into their arcuate shape shown exploded in FIG. 5. The forward first panel section 48 includes a longitudinal first edge 62 and a longitudinal second edge 64. The forward second panel section 50 includes a longitudinal first edge 66 and a longitudinal second edge 68. The forward third panel section 52 includes a longitudinal first edge 70 and a longitudinal second edge 72.

As shown in FIG. 7A, forward portion 40 is formed planarly when the forward third panel section 52 is welded intermediate the first panel section 48 associated with first side 36 and the second panel section associated with second side 38. A first union 74 is defined between the abutment of forward first panel section 48 and forward third panel section 52. A second union 76 is defined between the abutment of forward second panel section 50 and forward third panel section 52. When the forward portion 40 is laid flat as depicted in FIG. 7A, the first union 74 and second union 76 are offset and spaced apart parallel relatively to each other and are oriented longitudinally extending from a forward end towards the rear end.

With continued reference to FIG. 6, each of the forward panel sections includes a trailing edge positioned rearwardly from a leading edge. Particularly, forward first panel section 48 includes a trailing edge 78 and a leading edge 80. The forward second panel section 50 includes a trailing edge 82 and a leading edge 84. The forward third panel section 52 includes a trailing edge 86 and a leading edge 88. When the forward panel sections 48, 50, and 52 are aligned longitudinally side by side and welded together, the respective trailing edges 78, 82, and 86 are flushly aligned along a common transverse plane as indicated in FIG. 7A. A common trailing edge 90 (FIG. 7A) of the forward portion 40 of trailer body 22 is defined collectively from the abuttingly aligned trailing edges 78, 82, and 86.

With continued reference to FIG. 6, the rear fourth panel section 54 includes a first side edge 92, a second side edge 94, a trailing edge 96, and a leading edge 98. The rear fifth panel section 56 includes a first side edge 100, a second side edge 102, a trailing edge 104, and a leading edge 106. The rear sixth panel section 58 includes a first side edge 108, a second side edge 110, a trailing edge 112, and a leading edge 114. The rear fourth panel section 54 is positioned and associated with the first side 36 and the rear fifth panel section 56 is positioned and associated with second side 38. Thus, the rear sixth panel section 58 is positioned intermediate the fourth and fifth panel sections respectively. The rear panel sections 54, 56, and 58 are longitudinally aligned to form a third longitudinally extending union 116 and a fourth longitudinally extending union 118. The third union 116 is defined between the longitudinal abutment between second side edge 94 on the rear fourth panel section 54 and the first side edge 108 on the rear sixth panel section 58. The fourth union 118 is defined between the longitudinal abutment of second side edge 110 on the rear sixth panel section 58 and the first side edge 100 on the rear fifth panel section 56. Collectively, the rear fourth panel section 54, the rear fifth panel section 56, and the rear sixth panel section 58 define the rear portion 42 of trailer body 22.

With continued reference to FIG. 7A, the leading edges of the rear panel sections are aligned flushly along a common plane to define a common leading edge 120. As will described in greater detail below, when the trailer body 22 is fully assembled, the common leading edge 120 on the rear portion 42 is abuttingly aligned with the common trailing edge 90 on forward portion 40 along a common transverse plane preferably perpendicular to the unions 74, 76, 116, and 118. Additionally, when the common trailing edge 90 is abuttingly aligned with the common leading edge 120, the first union 74 is longitudinally coplanar with the third union 116 and the second union 76 is longitudinally coplanar with the fourth union 118.

With continued reference to the unions 74, 76, 116, and 118, in accordance with respect to the present disclosure, each of these unions is a butt joint formed from two adjoining plates abutted together and welded in place. The respective butt joints are formed by fabricating the trailer body in planar sections and welding them together to create larger planar panels. As will be described greater detail below, after the butt joint unions have been formed, the collective planar panel is then rolled to give the trailer body its arcuate shape. This is in stark contrast to the conventional half-round dump trailer 1 (FIG. 1; Prior Art) which is fabricated by first rolling its panel sections and then welding them together which requires welded lap joints of overlapping sections of material. The butt joints formed from the unions in the present disclosure provide advantages over lap joints of conventional trailers in that the butt joint unions are easier to assemble, may be stronger in some instances, and can provide a more aesthetic appearance due to the smooth and flush alignment of the respective inner and outer surfaces across the union. This is distinct from conventional trailers because overlapping joints do not provide flushly aligned surfaces. Furthermore, overlapping lap joints may be compromised (i.e. weakened) in strength at the points where the overlap portion ends.

With continued reference to FIG. 6, the supportive brace member 60 is formed from first support member 122 and a second support member 124. First and second support members 122, 124 are structurally identical and mirrored about a longitudinal plane defined by a union 126 connecting the first support member 122 to the second support member 124. The first support member 122 is initially formed as a substantially planar sheet of metal including a first side end 128 that extends arcuately between curved edges extending outwardly to a leading arcuate apex edge 130 and a trailing arcuate apex edge 132. The edges curve taperedly inwardly towards longitudinally aligned medial edge 134 which is adapted to connect with an identical medial edge on second support member 124. Support member 122 defines a vertically aligned rounded aperture 136 therethrough. Similar reference numerals are used for corresponding features on the second support member 124. In one particularly embodiment, support member 60 forms entirely arcuate edges when the first and second support member 122, 124 are butt-welded together. Stated otherwise, the arcuate support brace or member 60 does not have any linear outermost edges when the first and second support members 122, 124 are connected together.

As depicted in FIG. 7A, support member 60 is first formed by aligning the medial edges 134 of the first support member 122 and the second support member 124. The aligned medial edges 134 are positioned in an abutting relationship to form a butt joint and are welded together to create union 126. Supportive brace member 60 identified in FIG. 7A is substantially planar prior to being formed in an arcuate manner as identified in FIG. 5.

As depicted in FIG. 8A, forward portion 40 of trailer body 22 has at least one planar surface formed from the flush alignment of the forward first panel section 48, the forward second panel section 50, and the third forward panel section 52. The embodiment depicted in FIG. 8A identifies that outer surface 44 of trailer body 22 is substantially flat and additionally the inner surface 46 of trailer body 22 is substantially flat as well. Recall, FIG. 8A depicts the welded sections 48, 50, and 52 planar arrangement prior to being rolled to give trailer body 22 its arcuate profile, which will be described in greater detail hereinafter.

FIG. 8B and FIG. 8C detail alternative embodiments of the present disclosure that wherein only one surface of forward portion 40 of trailer body 22 is substantially flat and coplanar prior to being rolled and formed into its arcuate profile. Namely, FIG. 8B depicts the exterior surface 44 substantially flat and planar and the inner surface 46 has a step-wise profile due to increased thickness of the forward third panel section 52. The increased thickness of third section 52 relative to the exterior surface of first and second sections 48, 50 provides a strengthening function for the center of the assembled trailer body 22. This is beneficial as the trailer body 22 is configured to haul bulk materials and the intermediate third panel section 52 is positioned at the bottom of the assembled trailer body 22 which supports a majority of the bulk material weight being hauled by trailer 20. FIG. 8C depicts a scenario where prior to being rolled into its arcuate formation, the inner surface 46 is substantially flat and coplanar and the exterior surface 44 has a step-wise profile formed from the greater thickness of the forward third panel section 52. The uniform thickness of the forward panel sections in FIG. 8A is identified as dimension 138A. For the embodiments detailed in FIG. 8B and FIG. 8C, the increased thickness of the third panel section 52 is identified as dimension 138B.

Reference is now made to the manufacture of trailer body 22 with respect to the welding and rolling process to give the trailer body 22 having butt joints in its arcuate profile. As indicated in FIG. 6, the panel sections 48, 50, 52, 54, 56, and 58 are aligned in a manner such that the forward panel sections 48, 50, and 52 are positioned longitudinally forward from the rear panel sections 54, 56, and 58. The second panel section 50 is aligned intermediate the first and second panel sections 48, 50. The forward panel sections are welded together to create forward portion 40. The welds defining the first union 74 and the second union 76 are butt joints having no overlap. Initially, the forward portion 40 is a planar sheet of metal before it is rolled.

Figure 14A:
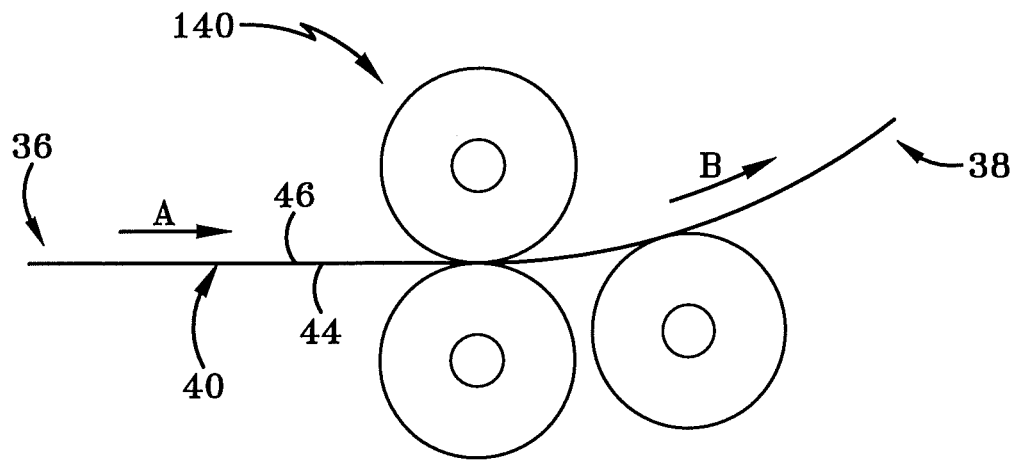
FIG. 14A is a diagrammatic view of a rolling system in operation for rolling the larger planar portions of the trailer body.
Figure 14B:
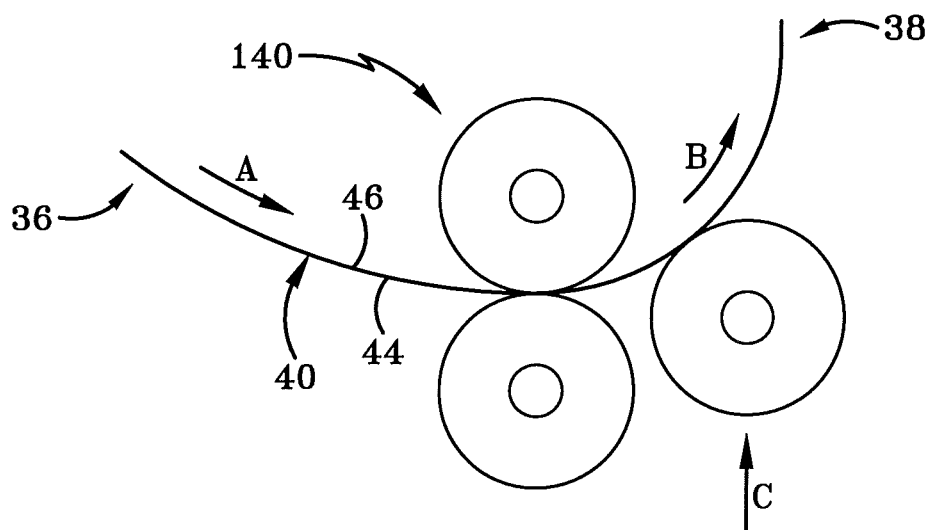
FIG. 14B is a diagrammatic view of the rolling system in operation for rolling the larger planar portions of the trailer body.
Figure 14C:
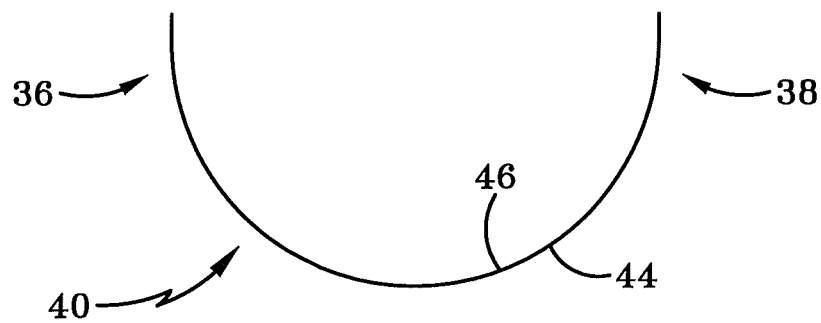
FIG. 14C is a diagrammatic view of the arcuate body profile imparted to the welding panels by the rolling system.

FIG. 14A through FIG. 14C details the rolling process to create the arcuate profile of the forward portion 40 and the rear portion 42 of trailer body 22. Description hereinafter is made with reference to forward portion 40. However, it is to be understood that the rear portion 42 is formed in a similar manner. Forward portion 40 is fed transversely through a rolling machine, or rolling assembly 140. Rolling assembly 140 may include a set of pinch rollers and a bend roller which are detailed in diagrammatic form and are not intended to be limiting as one having ordinary skill in the art would understand. The planar portion 40 is fed between the pinch rollers in the transverse direction moving along in the direction of arrow A. As planar forward portion 40 moves through the rolling assembly 140, a bend roller may bend the forward portion 40 in the arcuate direction of arrow B. As indicated in FIG. 14B, some implementations may include a bend roller movable in the vertical direction as indicated by arrow C to further establish the arcuate profile of forward portion 40 as indicated in FIG. 14C.

In accordance with an aspect of the present disclosure, the sequential formation of trailer body 22 may be critical in some implementations. Namely, the butt joints defining the first union 74 and the second union 76 on forward portion 40 are welded prior to being rolled in rolling assembly 140. This is in contradistinction to a conventional half-round dump trailer manufacturing method. Recall that the conventional manufacturing method first requires for the planar sheets of material to be rolled then welds the arcuate sections together using overlapping lap joints and reinforcing them with a supportive member angle iron extending longitudinally along the length of the conventional trailer.

The butt joint formation method identified hereinabove enables the outer surface 44 and the inner surface 46 of the trailer body 22 to be smooth as indicated in FIG. 8A. Additionally, other implementations may find it desirable to have only one surface of trailer body 22 entirely smooth and the opposite surface may form a step-wise profile wherein one of the panel sections is thicker than the other panel sections. Even further, it is still possible for the center forward third panel section 52 to be thicker than first and second panel sections such that the butt joints form a step-wise profile along the outer surface 44 and the inner surface 46.

After the first portion 40 of trailer body 22 has moved through the rolling assembly 140 and given an arcuate profile as indicated in FIG. 14C, a similar process occurs with respect to the rear panel sections 54, 56, and 58 forming rear portion 42 of trailer body 22. The butt joint method identified herein above forms the third union 116 and the fourth union 118. After the rear portion 42 has been rolled in the rolling assembly 140 to be given an arcuate profile, the common trailing edge 90 of the forward portion 40 is mated with the common leading edge 120 of the rear portion 42. The trailing edge 90 and the leading edge 120 join together at a butt joint union 141. The butt joint 141 between forward portion 40 and rear portion 42 continues the flush and smooth surfaces along the trailer body when so desired. For example, when an embodiment of trailer body 22 depicted in FIG. 8 is formed, the outer surface 44 of trailer body 22 is flush and smooth across the butt joint union 141. Similarly, the inner surface 46 may be smooth and flush across inner portions of union 141.

Figure 7B:
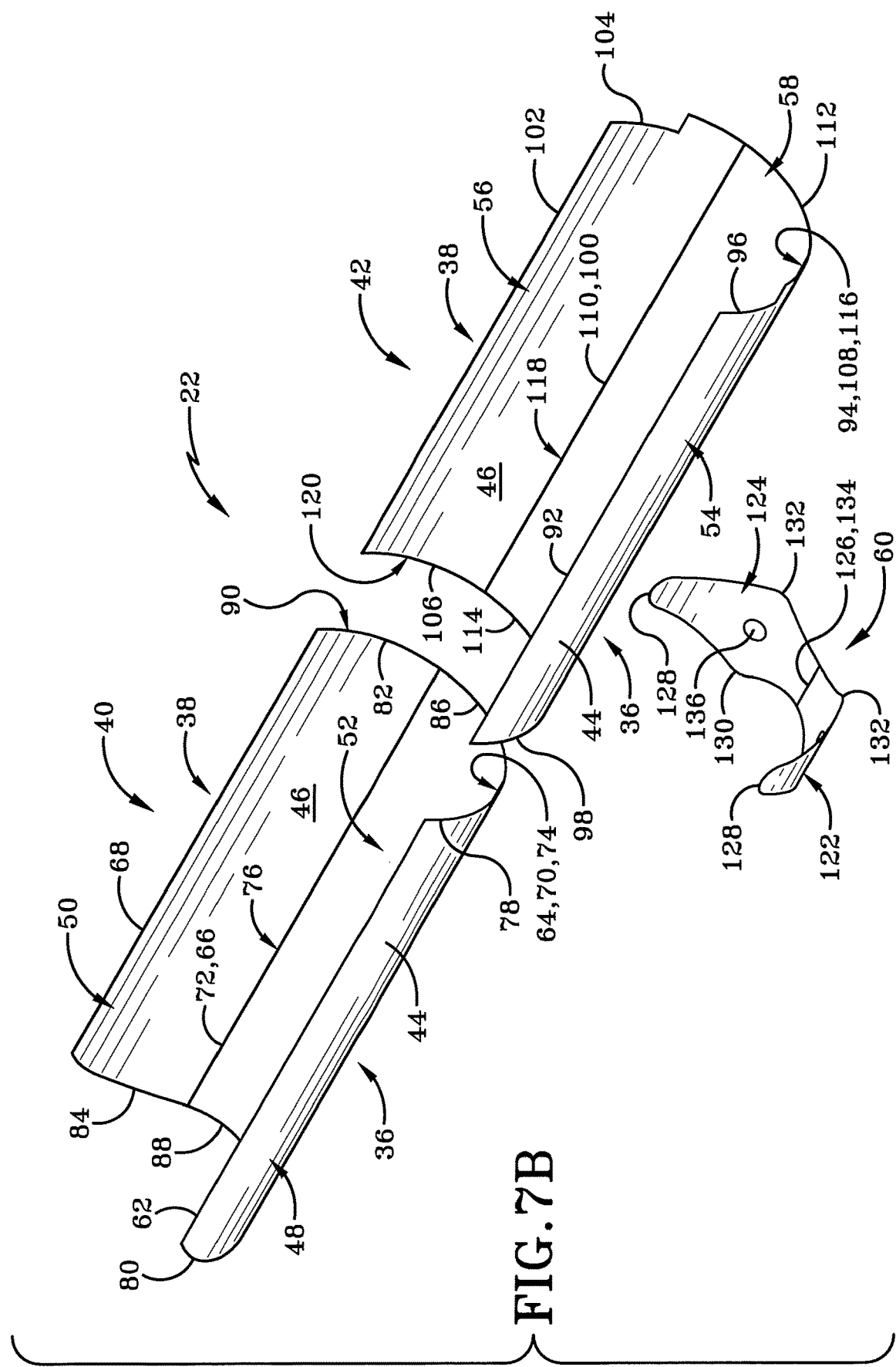
FIG. 7B is a perspective view of the trailer body of the first embodiment detailing the partially formed trailer body wherein the joined panels have been rolled in a rolling system as larger sheets to provide the arcuate profile of the trailer body.
Figure 7C:
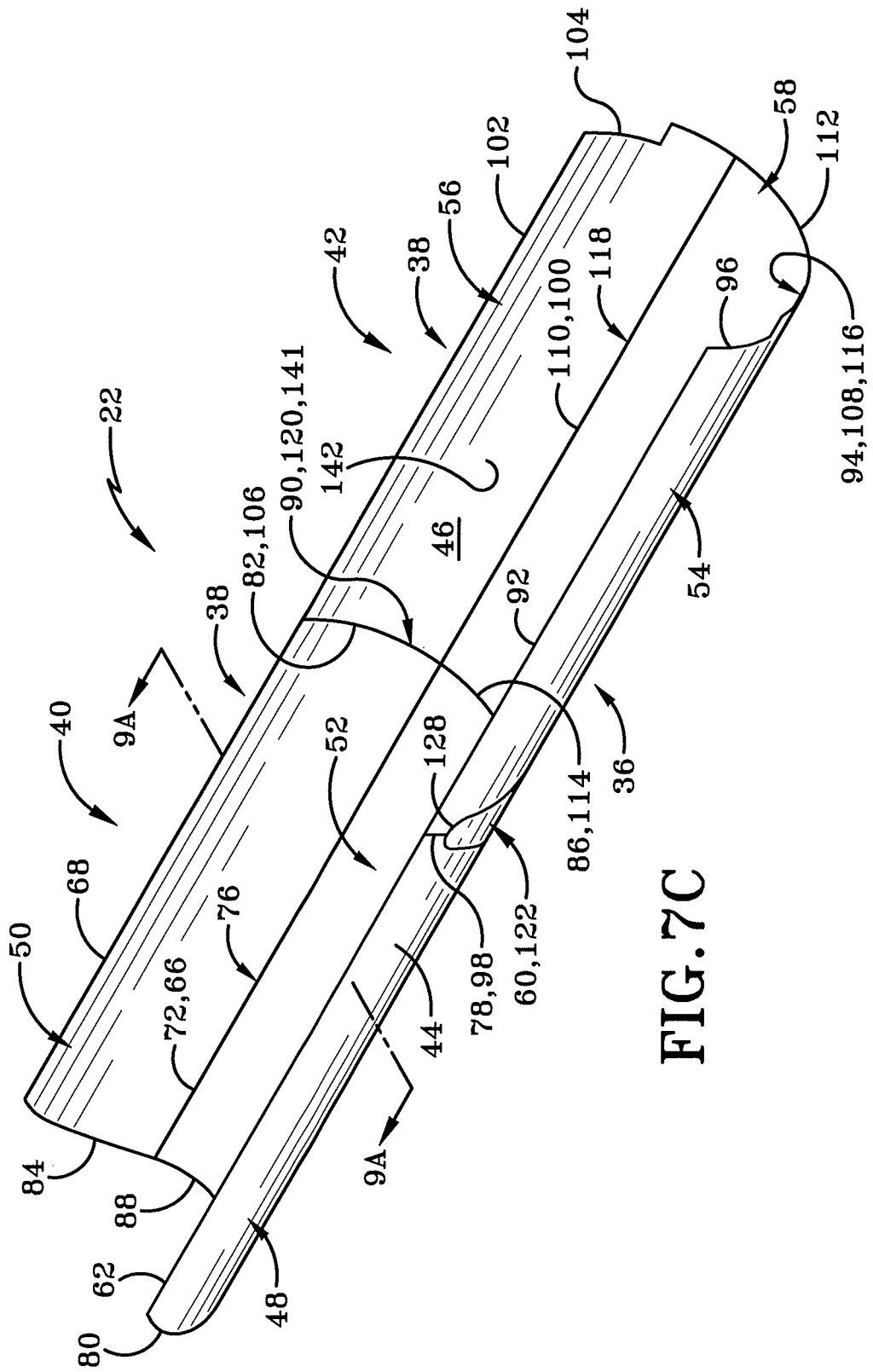
FIG. 7C is a perspective view of the trailer body of the first embodiment detailing the formed trailer body where a forward body portion is joined with a rear body portion.

Referring back to FIG. 7C, union 141 extends transversely substantially orthogonal to the first union 74, second union 76, third union 116, and the fourth union 118. In order to ensure the strength of the trailer body across transverse union 141, the protective brace members 60 may be rigidly secured to the outer surface 44 of trailer body 22 and span longitudinally across the union 141. It is worth noting that the protective brace member 60 may also be formed in a planar butt joint arrangement and then fed through rolling assembly 140 to impart a complimentary arcuate profile to the supportive brace members 60 having a radius of curvature similar to that of outer surface 44 on trailer body 22 (as shown in FIG. 7B).

Figure 9A:
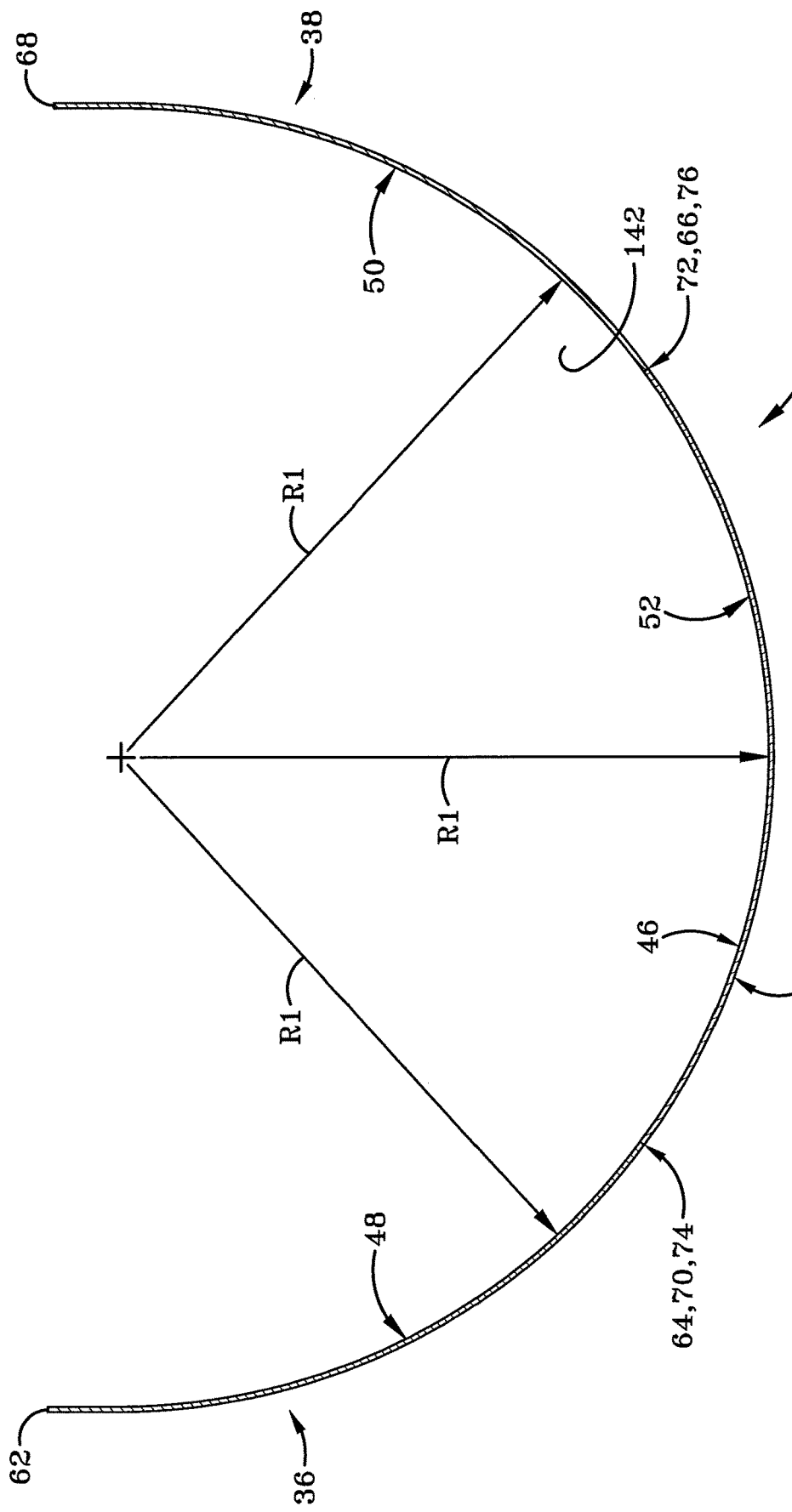
FIG. 9A is a cross section view taken along line 9A-9A in FIG. 7C depicting a uniform radius of curvature after the planar forward portion has been rolled.

As depicted in FIG. 9A, one embodiment of trailer body 22 is depicted with a uniformly arcuate concave inner surface 46 defining an interior containing volume 142 for receiving bulk materials therein. Because the concave inner surface 46 is uniform across the three forward panel sections 48, 50, and 52, the common radius of curvature R1 is associated with each of the forward panel sections. Stated otherwise, the radius of curvature R1 is the same for the forward first panel section 48, the forward second panel section 50, and the forward third panel section 52. The uniform radius of curvature across the three forward panel sections is accomplished as discussed herein above by forming the three panel sections with an abutting butt joint at the first union 74 and the second union 76 respectively.

Figure 9B:
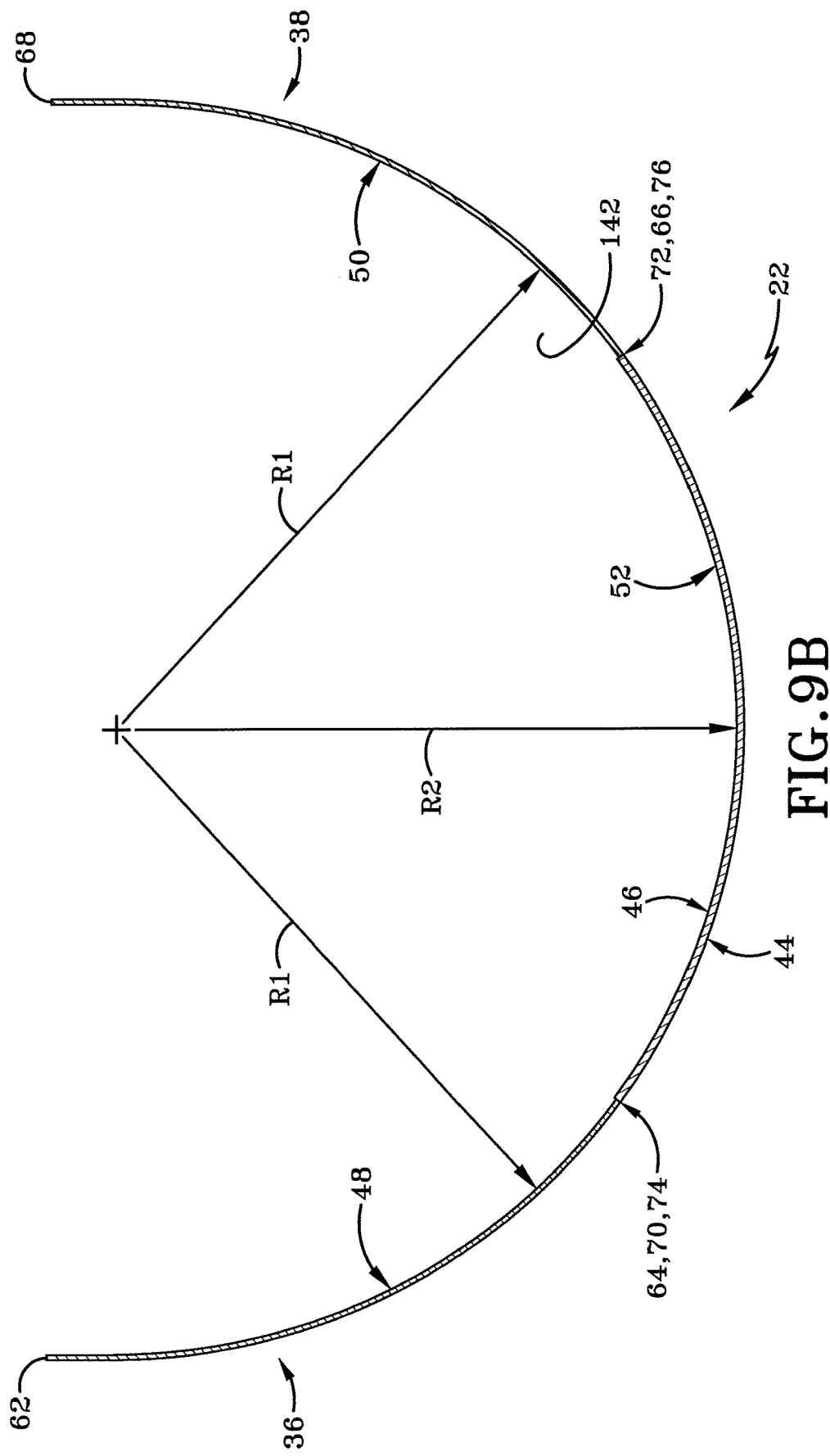
FIG. 9B is a cross section view similar to FIG. 9A depicting a non-uniform radius of curvature of the thicker panel depicted in FIG. 8B.

As depicted in FIG. 9B, one embodiment of the formed trailer body 22 may have a convex inner surface 46 that does not have a uniform radius of curvature. Namely, intermediate third panel section 52 is raised due to the greater thickness 138B as indicated in FIG. 8B. Accordingly, a second radius of curvature R2 is established that is less than the first radius of curvature R1. As such, a step-wise profile is generated which forms at the respective first and second unions 74, 76 where the intermediate third panel section 52 respectively connects to the first and second forward panel sections.

Figure 9C:
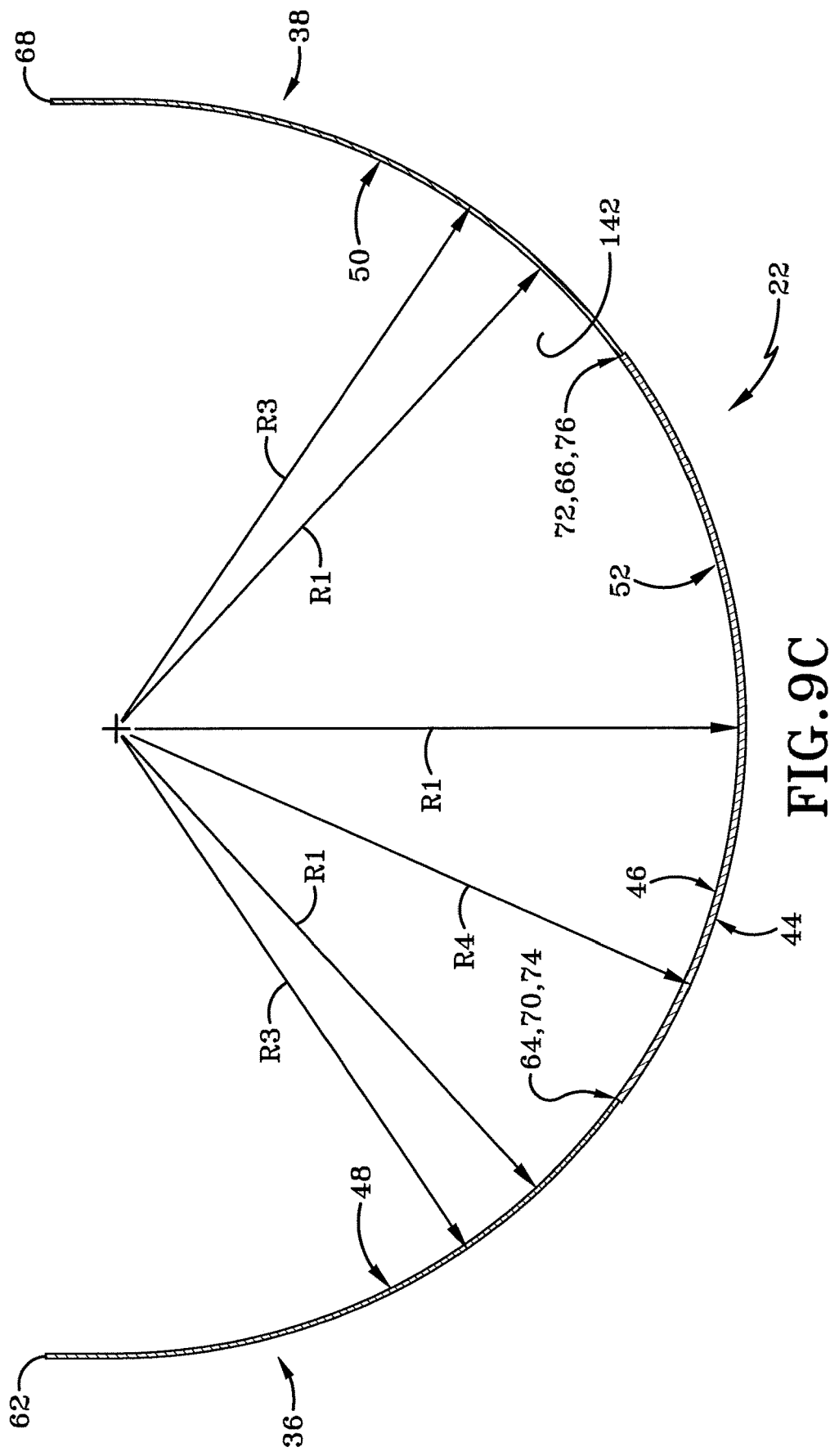
FIG. 9C is a cross section view similar to FIG. 9A depicting a non-uniform radius of curvature of the thicker panel depicted in FIG. 9C.

FIG. 9C depicts a scenario where the inner surface 46 of the trailer body 22 is uniform across the unions 74 and 76, but is not symmetrically uniform with respect to the curvature of the outer surface 44. The embodiment of the trailer depicted in FIG. 9C includes a third radius of curvature R3 associated with the outer surface that is less than a fourth radius of curvature R4. The greater thickness 138B of intermediate third panel section 52 establishes an outside step-wise profile of trailer body 22.

The trailer body 22 and the method of formation thereof as discussed hereinabove is not exclusive to the present disclosure. As depicted in FIG. 10 through FIG. 13, an alternative embodiment in accordance with the present disclosure depicts a trailer body generally at 200. Trailer body 200 comprises four panel sections that define the arcuate profile of trailer body 22 when manufactured and fully assembled.

Figure 10:
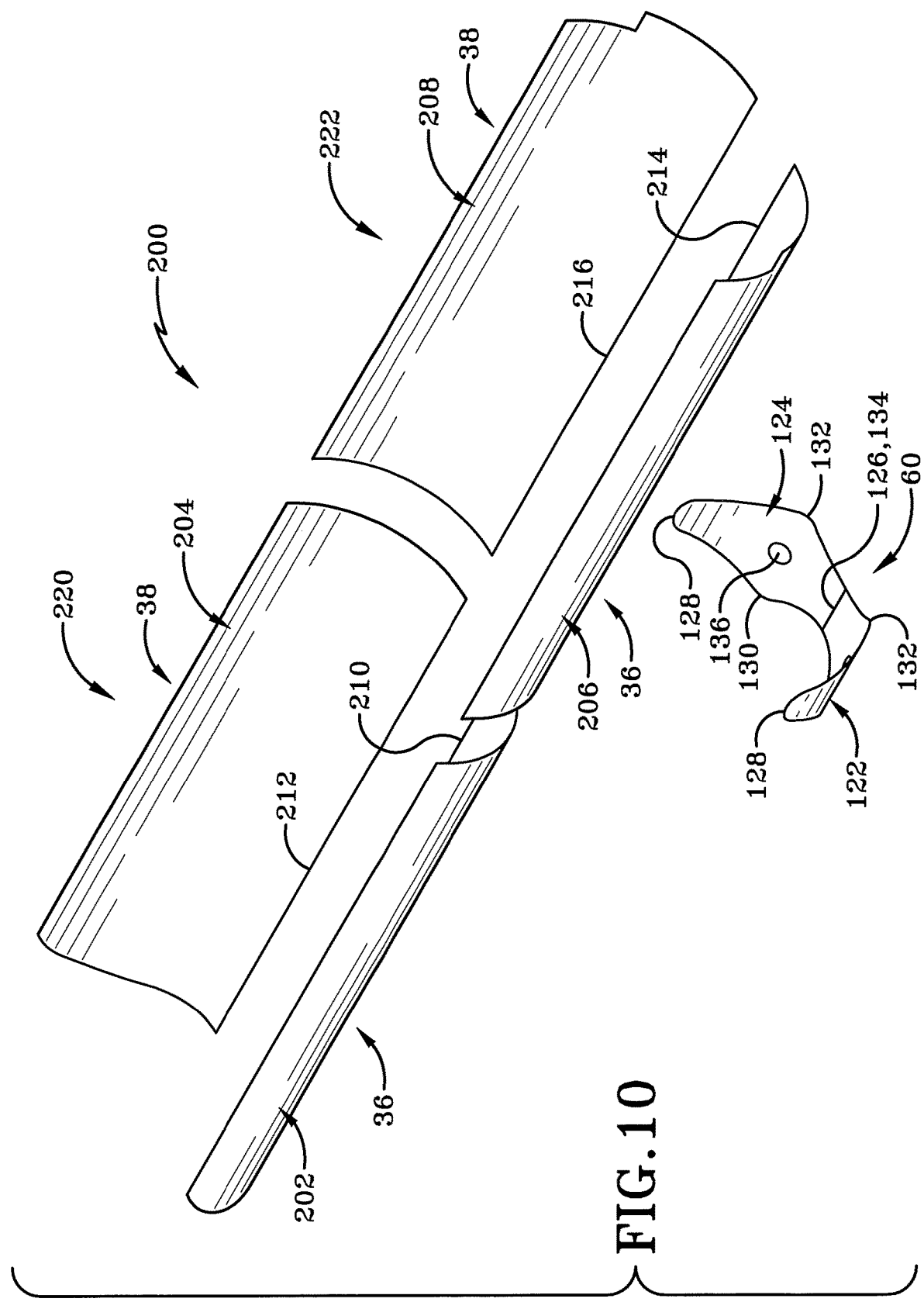
FIG. 10 is an exploded perspective view of a trailer body of a second embodiment detailing curved panels.

In one implementation, trailer body 200 may include a forward first panel section 202, a forward second panel section 204, a rear third panel section 206, and a rear fourth panel section 208. The trailer body 200 may further include a supportive brace member 60 similar to that depicted herein above. The exploded view in FIG. 10 depicts the generally arcuate profile of trailer body 200 formed from four arcuate panel sections having a longitudinally extending union at the bottom, or lowermost portion, of the trailer body 200 defining an interior containing volume 142.

Figure 11A:
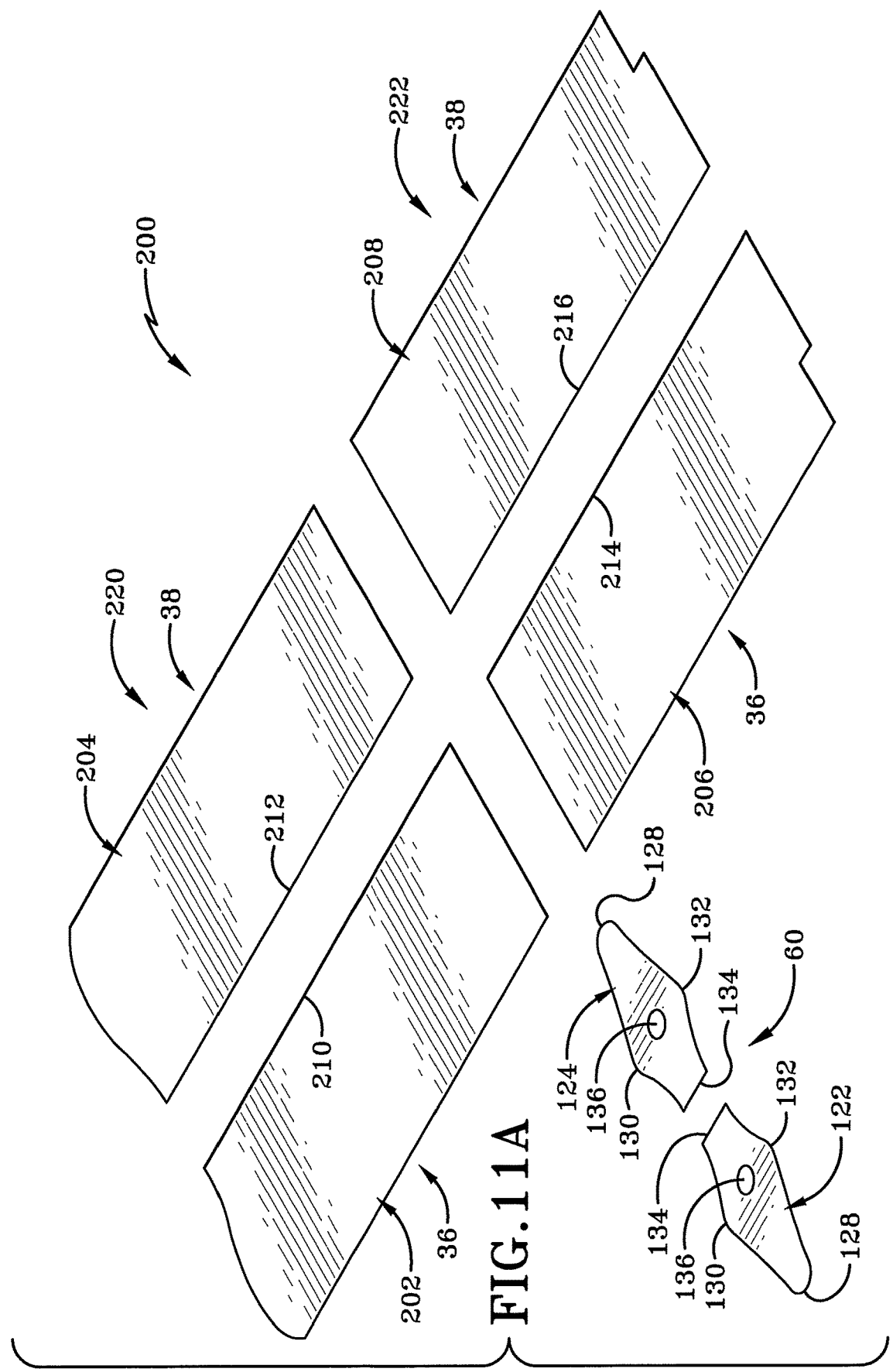
FIG. 11A is a perspective view of the trailer body of the second embodiment detailing a partially formed trailer body wherein the planar panels are joined together prior to being rolled into an arcuate profile.

As indicated in FIG. 11A, a longitudinally extending first medial edge 210 is located on the forward first panel section 202. A longitudinally extending second medial edge 212 is located on forward second panel section 204. A longitudinally extending third medial edge 214 is located on the rear third panel section 206. A longitudinally extending fourth medial edge 216 is located on the rear fourth panel section 208.

Figure 11B:
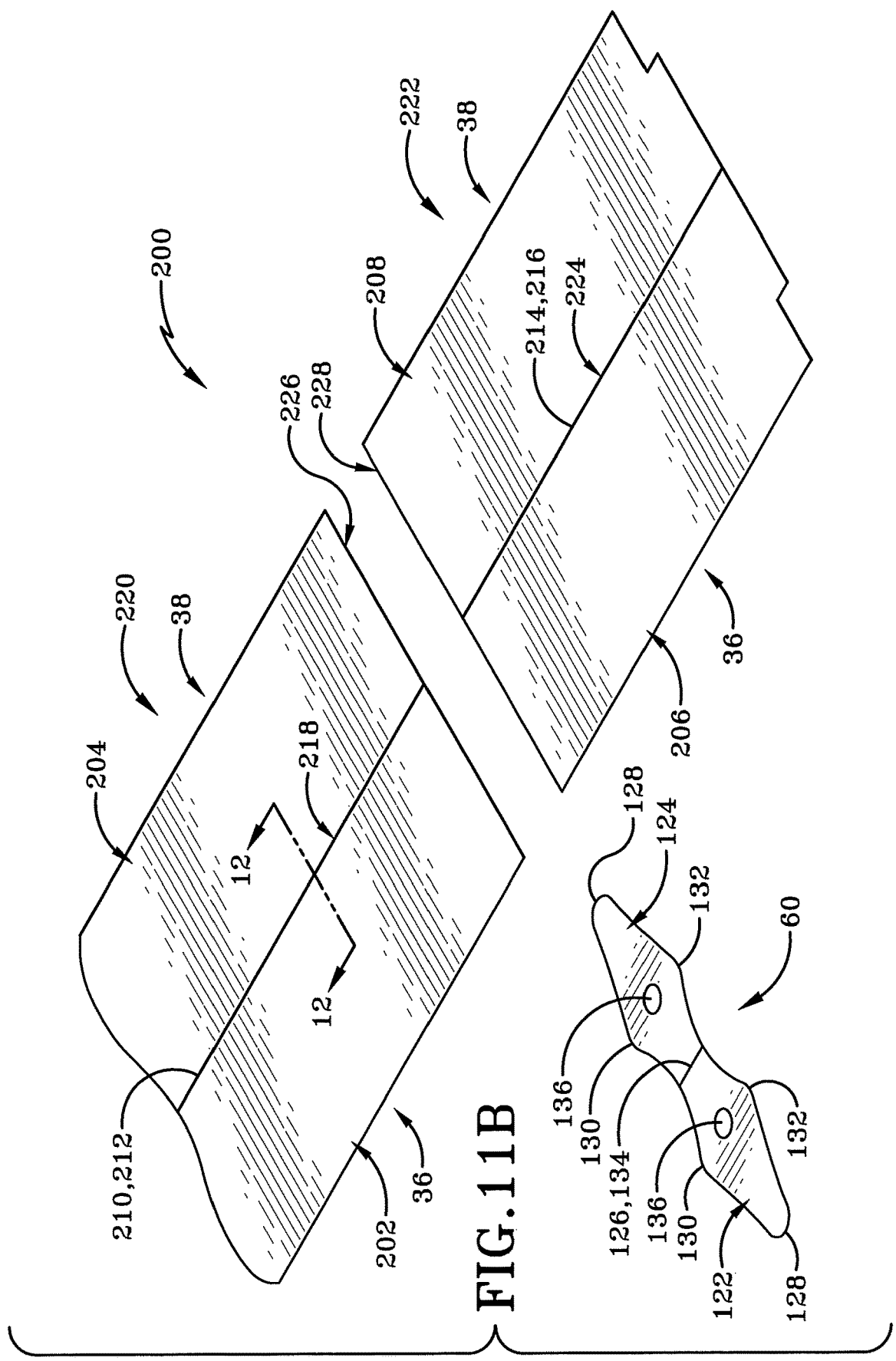
FIG. 11B is a perspective view of the trailer body of the second embodiment detailing the partially formed trailer body wherein the joined panels have been rolled in a rolling system as larger sheets to provide the arcuate profile of the trailer body.

As depicted in FIG. 11B, trailer body 200 is first formed by adjoining the first and second medial edges 210, 212 at a welded butt joint to form a longitudinally extending first union 218. First union 218 rigidly secures the forward first panel section 202 to the forward second panel section 204 to define a planar forward portion 220 of the trailer body 200.

Similarly, a rear portion 222 is formed when the rear third panel section 206 and the rear fourth panel section 208 are aligned at their respective third and fourth medial edges 214, 216 to define a second longitudinally extending union 224. On one particular embodiment, the first union 218 and the second union 224 are halfway between the first side 36 and the second side 38 of trailer body 200.

When the forward portion 220 is rigidly formed from the rigid connection of the first and second panel sections, a common trailing edge 226 is defined. Similarly, a complementary leading edge 228 is defined on the rear portion 222 when the third and fourth panel sections are rigidly secured together.

Prior to securing the forward portion 220 to the rear portion 222, each planar portion is rolled to give the trailer body 200 an arcuate profile. The manner in which the forward portion 220 and the rear portion 222 are rolled is similar to that discussed above with reference to FIG. 14A through FIG. 14C.

Once the forward portion 220 and the rear portion 222 have been rolled, they may be abutted by aligning the common trailing edge 226 with the common leading edge 228 to create a transversely extending union 231 formed at a butt joint between the forward portion 220 and the rear portion 222. The supportive brace 60 may be welded to the exterior surface of the trailer body as indicated in FIG. 11C. The exterior supportive brace 60 longitudinally spans the transverse union 220 and transversely spans the longitudinally extending union 218, 224.

Figure 13:
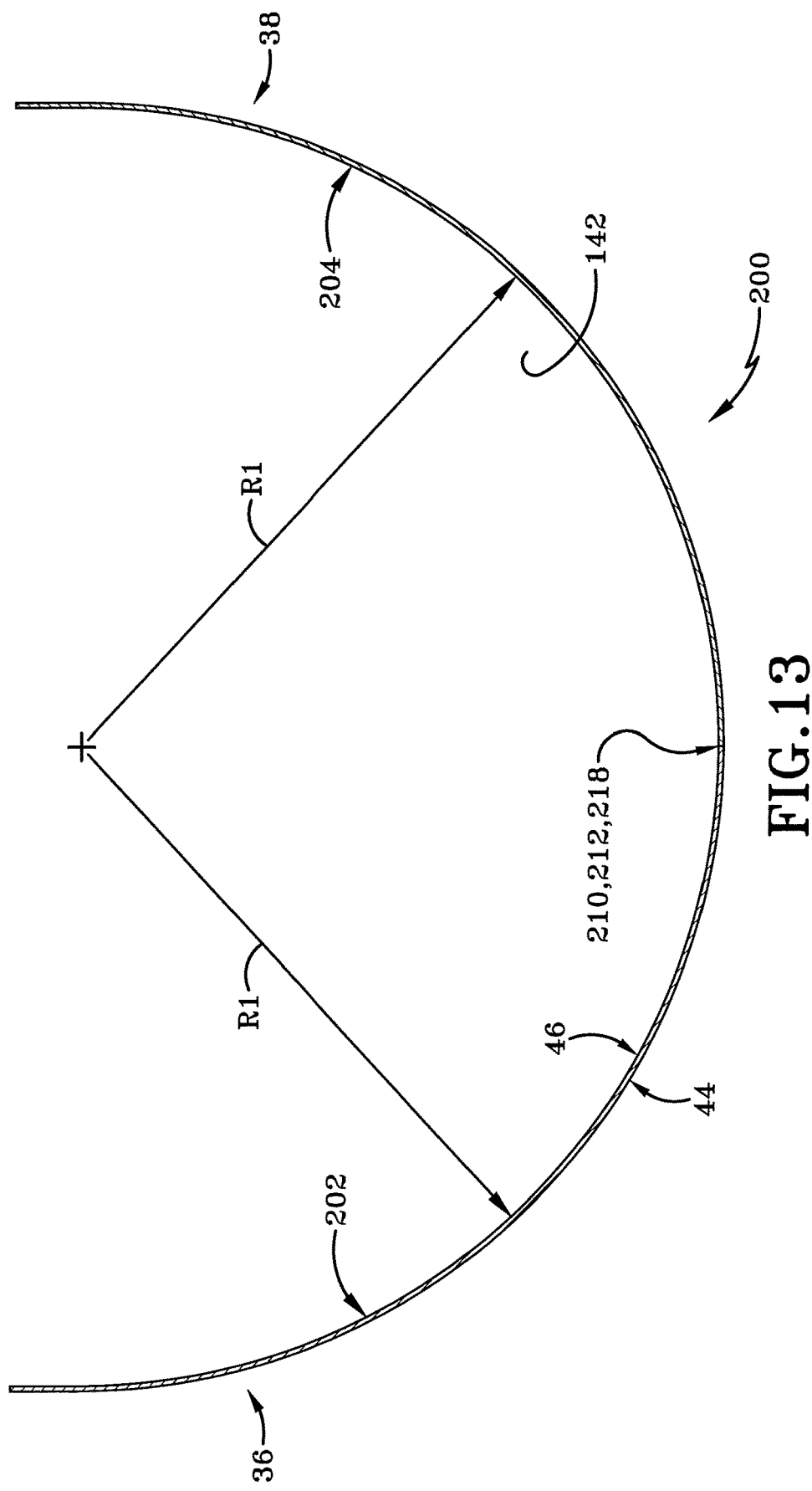
FIG. 13 is a cross section view of the second embodiment taken along line 13-13 in FIG. 11C.

As indicated in FIG. 13, the first union 218 and the second union 224 may be located at the bottom, or lowermost portion, of trailer body 200. Similar to the previous embodiment described above, trailer body 200 may include a concave inner surface 46 opposite a convex outer surface 44 having a uniform radius of curvature R1.

As depicted in FIG. 12, trailer body 200 may also have a uniform thickness 138A similar to that of trailer body 22 identified in FIG. 8A through FIG. 8C. While not shown in FIG. 12, there may be plate formations that would have a tapered profile that can be thicker towards the center section or the medial longitudinally extending medial plane defined by union 218 to provide an increased strength to the bottom portion of trailer body 200 once the trailer has been rolled and formed into its arcuate profile.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or"

should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A half-round dump trailer comprising:
   a forward end spaced apart from a rear end defining a longitudinal direction therebetween, a first side opposite a second side defining a transverse direction therebetween;
   a trailer body formed from a plurality of arcuate plates welded together at butt seams collectively defining an outwardly and downwardly facing convex outer surface on the trailer body and defining an inwardly and upwardly facing concave inner surface on the trailer body adapted to retain bulk materials;
   a longitudinally extending bottom butt welded seam between transversely adjoining arcuate plates, wherein the bottom butt welded seam defines a lowermost portion of the concave inner surface on the trailer body;
   a trolley supporting the trailer body from below adjacent the rear end; and
   a structurally supportive brace member positioned exterior to the convex surface adjacent the bottom butt weld; wherein the supportive brace member is configured to support the trailer bottom when the dump trailer is raised from a lowered first position to a raised second position.

2. The half-round dump trailer of claim 1 wherein the longitudinally extending bottom butt welded seam is centered between the first and second sides.

3. The half-round dump trailer of claim 1 wherein the longitudinally extending bottom butt welded seam extends between the forward end and the rear end.

4. The half-round dump trailer of claim 1 further comprising:
   a first arcuate plate extending upwardly and arcuately towards the first side from the bottom butt weld;
   wherein a portion of the convex outer surface on the first arcuate plate is continuous across a transition region where the plate arcuately transitions from generally horizontal adjacent the bottom butt weld to generally vertical adjacent an upper terminal end.

5. The half-round dump trailer of claim 4 further comprising:
   a second arcuate plate extending upwardly and arcuately towards the second side from the bottom butt weld;
   wherein a portion of the convex outer surface on the second arcuate plate is continuous across a transition region where the plate arcuately transitions from generally horizontal adjacent the bottom butt weld to generally vertical adjacent an upper terminal end.

6. The half-round dump trailer of claim 5 wherein the convex outer surface is free of any longitudinally aligned external supports attached thereto.

7. The half-round dump trailer of claim 5 wherein the concave inner surface is flush across the bottom butt welded seam between the first and second sides.

8. The half-round dump trailer of claim 7 further comprising:
   a radius of curvature associated with the concave inner surface, wherein the radius of curvature is equal for the first arcuate plate and the second arcuate plate on opposite sides of the bottom butt welded seam.

9. The half-round dump trailer of claim 1 further comprising:
   on the trailer body, the outer surface including a first portion near the bottom butt weld generally horizontal and parallel to ground when the trailer is in a lowered position, and the outer surface including a second portion near an upper terminal end generally vertical and perpendicular to ground when the trailer is in the lowered position;
   wherein the trailer body is curved between the first portion and the second portion; and
   wherein there is no angled support member extending exterior relative to the outer surface between the first portion and the second portion of the outer surface.

10. The half-round dump trailer of claim 1 further comprising:
    a forward frameless trailer body portion defining the forward end; and
    a rear frameless trailer body portion defining the rear end.

11. The half-round dump trailer of claim 10 further comprising:
    a transversely extending union between the forward frameless trailer body portion and the rear frameless trailer body portion.

12. The half-round dump trailer of claim 11 wherein the forward frameless trailer body portion further comprises:
    a forward first arcuate plate extending upwardly and arcuately towards the first side from a centerline of the trailer;
    a forward second arcuate plate extending upwardly and arcuately towards the second side from the centerline of the trailer; and
    a longitudinally extending first union formed from a first butt weld connecting the forward first panel and the forward second panel.

13. The half-round dump trailer of claim 12 wherein the rear frameless trailer body portion further comprises:
    a rear third arcuate plate extending upwardly and arcuately towards the first side from a centerline of the trailer;
    a rear fourth arcuate plate extending upwardly and arcuately towards the second side from the centerline of the trailer; and
    a longitudinally extending second union formed from a second butt weld connecting the rear third panel and the rear fourth panel;

wherein the first and second butt welds are longitudinally aligned and further defines the longitudinally extending bottom butt welded seam.

14. The half-round dump trailer of claim 11 wherein the transversely extending union further comprises:
   a transversely extending butt welded seam between the forward frameless body portion and the rear frameless body portion.

15. The half-round dump trailer of claim 14 wherein the transversely extending butt welded seam defines a flush alignment of the forward frameless trailer body portion, and the rear frameless trailer body portion across the butt weld.

16. The half-round dump trailer of claim 13 further comprising:
   an external arcuate support member directly connected to the outer surface of the dump trailer and covering the transversely extending union between the forward frameless trailer body portion and the rear frameless trailer body portion.

17. The half-round dump trailer of claim 16 wherein the support member only has arcuate edges.

18. The half-round dump trailer of claim 16 wherein the support member is symmetric about the longitudinal axis.

19. The half-round dump trailer of claim 16 further comprising:
   a leading apex on the arcuate support member; and
   a trailing apex on the arcuate support member opposite the leading apex.

* * * * *